United States Patent
Ding et al.

(10) Patent No.: US 11,511,227 B2
(45) Date of Patent: Nov. 29, 2022

(54) METHOD FOR ENHANCING DEGRADATION OF ESTER VOCS WITH CERIUM OXIDE SUPPORTED PALLADIUM SINGLE ATOM CATALYST UNDER LOW-TEMPERATURE MICROWAVE

(71) Applicant: TIANJIN UNIVERSITY, Tianjin (CN)

(72) Inventors: Hui Ding, Tianjin (CN); Jiahao Cui, Tianjin (CN); Jianbo Quan, Tianjin (CN); Dan Zhao, Tianjin (CN); Rui Liu, Tianjin (CN); Guanyi Chen, Tianjin (CN)

(73) Assignee: Tianjin University, Tianjin (CN)

( * ) Notice: Subject to any disclaimer, the term of this patent is extended or adjusted under 35 U.S.C. 154(b) by 740 days.

(21) Appl. No.: 16/236,365

(22) Filed: Dec. 29, 2018

(65) Prior Publication Data
US 2020/0016534 A1 Jan. 16, 2020

(30) Foreign Application Priority Data
Jul. 16, 2018 (CN) .......................... 201810787068.7

(51) Int. Cl.
*B01D 53/86* (2006.01)
*B01J 23/10* (2006.01)
(Continued)

(52) U.S. Cl.
CPC .......... *B01D 53/8668* (2013.01); *B01J 23/10* (2013.01); *B01J 23/44* (2013.01); *B01J 37/009* (2013.01);
(Continued)

(58) Field of Classification Search
CPC ........ B01D 53/8668; B01D 2255/1023; B01D 2257/708; B01D 2255/2065;
(Continued)

(56) References Cited

U.S. PATENT DOCUMENTS 6,458,741 B1 10/2002 Roark et al.
6,596,915 B1 7/2003 Satyapal et al.
(Continued)

FOREIGN PATENT DOCUMENTS

CN 101444746 A 6/2009
CN 106914278 A 7/2017

OTHER PUBLICATIONS

Machine translation of CN 10457654 A (Year: 2016).*
Machine translation of CN 102895969 A (Year: 2013).*
Machine translation of CN 107961804 A (Year: 2018).*

*Primary Examiner* — Nicholas A Smith

(57) ABSTRACT

A method for enhancing degradation of ester volatile organic compounds with a cerium oxide supported palladium single atom catalyst under low-temperature microwave comprises the steps of firstly preparing a single atom catalyst $Pd/CeO_2$, adding the catalyst $Pd/CeO_2$ into a reaction cavity, initiating microwave radiation to enhance the catalysis reaction, and quickly introducing an ester compound with a concentration of 50~5000 mg/m$^3$ and a space velocity of 2000~100000 h$^{-1}$ into the reaction cavity from a vapor phase sampling port to react when the reaction temperature is 10~80° C. A catalyst packed column is provided in the reaction cavity, the vapor phase sampling port is defined at the bottom of the reaction cavity, and an exhaust port is defined at the top of the cavity. The microwave method can enhance and activate active sites, prevent the aging of active sites, and enable the chemical reaction rate to be increased by more than 17.9%.

9 Claims, 1 Drawing Sheet

(51) Int. Cl.
*B01J 23/44* (2006.01)
*B01J 37/00* (2006.01)
*B01J 37/02* (2006.01)
*B01J 37/03* (2006.01)
*B01J 37/04* (2006.01)
*B01J 37/06* (2006.01)
*B01J 37/08* (2006.01)

(52) U.S. Cl.
CPC ......... *B01J 37/0236* (2013.01); *B01J 37/035* (2013.01); *B01J 37/04* (2013.01); *B01J 37/06* (2013.01); *B01J 37/08* (2013.01); *B01D 2255/1023* (2013.01); *B01D 2255/2065* (2013.01); *B01D 2257/708* (2013.01); *B01D 2259/806* (2013.01)

(58) Field of Classification Search
CPC ........... B01D 53/8687; B01D 2259/806; B01J 19/126; B01J 23/10; B01J 23/44; B01J 37/009; B01J 37/0236; B01J 37/035; B01J 37/04; B01J 37/06; B01J 37/08; B01J 37/346; B01J 23/63
See application file for complete search history.

(56) References Cited

U.S. PATENT DOCUMENTS

| | | | |
|---|---|---|---|
| 2007/0098614 A1* | 5/2007 | Iida | B01J 19/087 423/245.3 |
| 2008/0069963 A1 | 3/2008 | Bhattacharya et al. | |
| 2010/0166633 A1* | 7/2010 | Wu | B01J 35/04 502/241 |
| 2012/0028795 A1* | 2/2012 | Chan | B01J 35/0013 502/304 |

* cited by examiner

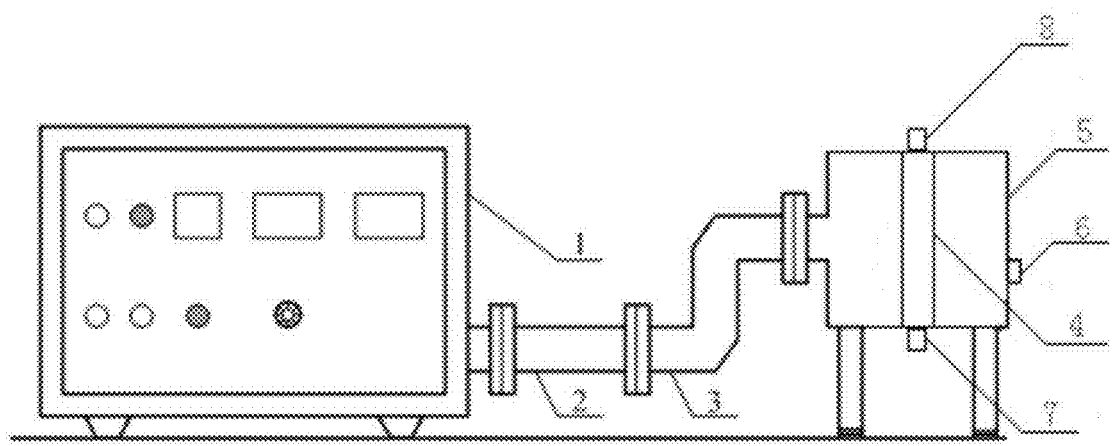

METHOD FOR ENHANCING DEGRADATION OF ESTER VOCS WITH CERIUM OXIDE SUPPORTED PALLADIUM SINGLE ATOM CATALYST UNDER LOW-TEMPERATURE MICROWAVE

CROSS-REFERENCE TO RELATED APPLICATIONS

This application claims priority to Chinese Patent Application No. 201810787068.7 with a filing date of Jul. 16, 2018. The content of the aforementioned applications, including any intervening amendments thereto, are incorporated herein by reference.

TECHNICAL FIELD

The disclosure belongs to the field of environmental protection, and relates to a method for enhancing degradation of ester VOCs with a cerium oxide supported palladium single atom catalyst under low-temperature microwave.

BACKGROUND OF THE PRESENT INVENTION

VOCs (Volatile Organic Compounds) are serious air pollutants. World Health Organization defines a VOC as any organic compound having an initial boiling point roughly in the range of 50 to 260° C. and having a saturated vapor pressure of 133 Pa at ordinary room temperature, including alkanes, olefins, aromatic hydrocarbons and derivatives thereof, alcohols, aldoketones, amines and amides, acids and anhydrides. VOCs are serious air pollutants, greatly harm to human body, can cause various discomforts of a human body and have toxicity and irritability. It has been known that many VOCs have neurotoxicity and kidney and liver toxicities, and even have carcinogenesis, can damage a cardiovascular system, cause gastrointestinal tract disorder, induce immune system, endocrine system and haemopoiesis diseases and lead to metabolic disorders. Meanwhile, VOCs play an important role in forming photochemical smoke and PM2.5 and can also result in generation of greenhouse gases and destruction of ozone spheres.

Microwave is an electromagnetic wave having a frequency of 300 MHz-300 GHz and a wavelength range of 0.001 m~1 m. Heating with microwave is in a manner of heat radiation, which has extremely good penetrability and can absorb a medium of microwave. Under the radiation of microwave, substance molecules generate high-frequency vibration and form mutual friction and collision, and the entirety of substances can quickly absorb microwave to raise the temperature, so that the defects of slow heat conduction temperature-rising rate and uneven heating are effectively overcome, and heating speed and efficiency are far superior to those in a conventional heating manner with heat conduction as a mechanism. Microwave influences molecular movement through a radiation electric field, for example, internal heating and external heating are simultaneously carried out by virtue of two manners namely dipole rotation and ionic conduction, thereby improving average energy of molecules but not changing structures of ionized atoms and molecules. Microwave heating has the characteristics of fast heating speed, even heating, selective heating and easy control. Microwave-radiated chemical reaction, is fast in reaction rate, high in conversion rate and high in selectivity, and is capable of reducing the amount of a catalyst. The ability of a substance to absorb microwave depends on a dielectric constant and a dielectric dissipation factor of this substance. The dielectric constant and dielectric dissipation factor corresponding to a polar molecule are large, its ability of absorbing microwave is strong, and the ability of a non-polar molecule to absorb microwave is weak. Selective heating of a compound can cause local overheating so as to form a temperature gradient to further accelerate movement of molecules or ions and increase a collision frequency of molecules or ions when in encounter.

Chinese Patent No. CN 101444746 A discloses a method for preparing a $CeO_2$-molecular sieve catalyst. The $CeO_2$-molecular sieve catalyst is prepared by using a mechanical lapping method with cerium (III) nitrate hexahydrate and a molecular sieve having strong acidity as raw materials. However, during combustion of VOCs in presence of the single-component $CeO_2$ catalyst, chlorine-containing substances are easily absorbed on the surface of the catalyst, so that the active center of the catalyst is covered, and the catalyst is inactivated. Meanwhile, for the catalyst prepared by using the lapping method, the uniformity of $CeO_2$ on the surface of the molecular sieve is insufficient, which hence significantly reduces the catalytic activity of the catalyst. Single atoms are a class of novel catalysts. Compared with the traditional supported catalyst, the single atom catalyst has the advantages that the single atom becomes the active site of the reaction, the catalyst-supporting amount is greatly reduced, and the catalytic effect is significantly improved.

The technology for treating ester VOCs at this stage is mainly the catalytic combustion method, but its initial combustion temperature is generally above 200° C. Compared with the traditional technology, the technology for catalytically degrading VOCs at room temperature can reduce the temperature and cost for VOCs treatment to a large extent, decrease energy consumption loss of equipment and improve security coefficient. It is simple in operation process, and meets requirements on green chemistry.

The method for preparing catalyst in the present disclosure is, simple and convenient, and does not need to precipitate and filter the cerium oxide solid. Cerium oxide and palladium are successively generated in the same reactor, and palladium is supported on a cerium oxide carrier, so as to prepare a single atom catalyst. The active metal component palladium can efficiently degrade ester VOCs, and rare earth elements in nanoscale can prevent the aggregation of palladium so that palladium is better immobilized on the carrier.

The single atom catalyst is easy to migrate and aggregate, and hence cause the reduction of activity and even inactivation. Microwave radiation can increase the average energy of component molecules or ions, and can enhance and activate the active site of the catalyst and prevents the aging of the active site. Chinese Patent. No. CN 106914278 A discloses a method for improving the stability of a single atom catalyst for catalytically combusting VOCs. In this disclosure, the single atom catalyst is prepared by formulating dopamine-containing trihydroxymethyl amino methane buffer, namely, dopamine-modified single atom catalyst having strong sinterability resistance and tolerance is obtained by annealing and calcining polydopamine. By using this method, the service life of the single atom catalyst is prolonged, but the active site of the catalyst is easily aged and inactivated.

SUMMARY OF PRESENT INVENTION

The objective of the disclosure is to overcome the defects of the existing technology and provide a method for enhancing degradation of ester VOCs with a cerium oxide supported palladium single atom catalyst under low-temperature microwave. Degradation of the cerium oxide supported palladium single atom catalyst on ester VOCs is enhanced utilizing a microwave-assisted method. The microwave method can enhance and activate an active site and prevent the aging of the active site, is capable of accelerating a chemical reaction rate and increasing a conversion rate, can degrade ester VOCs at room temperature without ozonation, and can provide a new thought and method for degradation, of VOCs.

In order to achieve the above objective, the disclosure adopts the following technical solutions.

Provided is a method for enhancing degradation of ester VOCs with a cerium oxide supported palladium single atom catalyst under low-temperature microwave, comprising the following steps:

(a) preparation of a catalyst:

(1) dissolving a cerium-containing compound into deionized water to form a solution; adding NaOH in the solution until pH=8~10, stirring and then reacting in a water bath pot to obtain cerium oxide-containing solution;

(2) adding a palladium-containing compound and sodium borohydride together into the cerium oxide-containing solution to react;

(3) after the reaction is ended, centrifuging the solution on a centrifuge, and then removing the solution in a centrifuge tube to obtain a precipitation product; and (4) washing the precipitation product with deionized water, drying overnight, and calcining in a muffle furnace at the $N_2$ atmosphere containing 3-7% of $H_2$ to obtain a single atom catalyst $Pd/CeO_2$;

(b) microwave-assisted enhancement of degradation:

adding the catalyst $Pd/CeO_2$ into a reaction cavity, opening a stirrer, initiating microwave radiation to enhance the catalysis reaction, and quickly introducing an ester compound with a concentration of 50~5000 mg/m³ and an space velocity of 2000~100000 h⁻¹ into the reaction cavity from a vapor phase sampling port to react when a reaction temperature is 10~80° C.

The cerium-containing compound is one or two of cerium nitrate and cerium chloride; the concentration of the cerium-containing compound dissolved into deionized water is 0.3~0.6 mol/L.

The water bath pot is at a constant temperature of 70~100° C.; and the cerium oxide-containing solution is obtained by reacting for 3~5 h.

The palladium-containing compound is one or two of palladium chloride and potassium tetrachloropalladate.

A mass ratio of the palladium-containing compound to sodium borohydride to the cerium oxide-containing solution is 1:(1~1.5):(10~100).

The speed of the centrifuge is 6000~10000 rpm, and centrifugation is carried out for 5~15 min.

The precipitation product is dried overnight at 70~110° C. Calcination is carried out for 1.5~2.5 h in a muffle furnace at the $N_2$ atmosphere containing 6~10% of $H_2$ and having a temperature of 250~350° C.

The microwave power of a microwave reactor is 200 W~700 W.

Compared with the prior art, the disclosure has the following beneficial effects that:

1. Degradation of ester VOCs with the cerium oxide supported palladium single atom catalyst is enhanced. The microwave-assisted method can enhance and activate the active site and prevent the aging of the active site. By using this method, a chemical reaction rate can be increased by more than 17.9%, and the conversion rate can be increased by more than 3% and reach as high as 94.8%.

2. The ester VOCs can be degraded at room temperature without ozonation, and operation is simple.

DESCRIPTION OF THE DRAWINGS

FIG. 1 is a diagram of a reaction device for enhancing degradation of ester VOCs with a cerium oxide supported palladium single atom catalyst under low-temperature microwave according to the disclosure;

In the FIGURE, 1—microwave generation source and display panel; 2—annular water load; 3—E surface bent waveguide; 4—catalyst packed column; 5—microwave reaction cavity; 6—infrared thermometer; 7—vapor phase sampling port; 8—exhaust port.

DETAILED DESCRIPTION OF PREFERRED EMBODIMENTS

The technical solutions in embodiments of the disclosure will be clearly and completely described in combination with embodiments of the disclosure in the following. Obviously, the described embodiments are only a part of embodiments of the disclosure but not all of the embodiments. Based on embodiments of the disclosure, other embodiments obtained by one of ordinary skill in the art without creative efforts are all included in the protection scope of the disclosure.

Provided is a method for enhancing degradation of ester VOCs with a cerium oxide supported palladium single atom catalyst under low-temperature microwave, comprising the following steps:

(a) preparation of a catalyst:

(1) dissolving a cerium-containing compound into deionized water so that its concentration is 0.3~0.6 mol/L;

(2) adding NaOH in the solution until pH=8~10, and completely reacting for 3~5 h in a constant-temperature water bath pot of 70~100° C. after stirring to obtain cerium oxide-containing solution;

(3) adding a palladium-containing compound and sodium borohydride together into the cerium oxide-containing solution, and stirring for 1~3 h, wherein, a mass ratio of the palladium-containing compound added in the solution to sodium borohydride added in the solution to the cerium oxide-containing solution is 1:(1~1.5):(10~100);

(4) after the reaction is ended, centrifuging the solution on a centrifuge at 6000~10000 rpm for 5~15 min, and then removing the solution in a centrifuge tube to obtain a precipitation product; and (5) washing the precipitation product with deionized water, then drying the precipitation product overnight at 70~110° C., and calcining in a muffle furnace at the $N_2$ atmosphere containing 6~40% of $H_2$ and having a temperature of 250~350° C. for 1.5~2.5 h to obtain a single atom catalyst $Pd/CeO_2$.

(b) microwave-assisted enhancement of degradation:

adding the catalyst $Pd/CeO_2$ into a reaction cavity, opening a stirrer, initiating microwave radiation to enhance the catalysis reaction, and quickly introducing an ester compound with a concentration of 50~5000 mg/m³ and a space velocity of 2000~100000 h⁻¹ into the reaction cavity from a vapor phase sampling port to react when a reaction temperature is 10~80° C.

The cerium-containing compound in the step (a) is one or two of cerium nitrate and cerium chloride.

The palladium-containing compound in the step (a) is one or two of palladium chloride and potassium tetrachloropalladate.

The microwave power of the microwave reactor in the step (b) is 200 W~700 W.

The catalyst of the disclosure can be used for purifying various low-concentration organic waste gases and other combustible component waste gases, such as industrial exhaust gases and automobile exhausts.

Example 1

(a) preparation of a catalyst:

(1) dissolving cerium nitrate into deionized water to form a solution in which the concentration of the cerium nitrate is 0.6 mol/L;

(2) adding NaOH in the solution until pH=10, and completely reacting for 5 h in a constant-temperature water bath pot of 100° C. after stirring to obtain cerium oxide-containing solution;

(3) adding palladium chloride and sodium borohydride together into the cerium oxide-containing solution, and stirring for 3 h, wherein, a mass ratio of palladium chloride added in the solution to sodium borohydride added in the solution to the cerium oxide-containing solution is 1:1.5:10;

(4) after the reaction is ended, centrifuging the solution on a centrifuge at 10000 rpm for 15 min, and then removing the solution in a centrifuge tube to obtain a precipitation product; and (5) washing the precipitation product with deionized water, then drying the precipitation product overnight at 110° C., and calcining in a muffle furnace at the $N_2$ atmosphere containing 10% of $H_2$ and having a temperature of 350° C. for 2.5 h to obtain a single, atom catalyst. $Pd/CeO_2$.

(b) microwave-assisted enhancement of degradation:

adding the catalyst $Pd/CeO_2$ into a reaction cavity, opening a stirrer, regulating the microwave power to 500 W, initiating microwave radiation to enhance the catalysis reaction, and quickly introducing an ester compound with a concentration of 2000 mg/m$^3$ and a space velocity of 100000 h$^{-1}$ into the reaction cavity from a vapor phase sampling port to react when a reaction temperature is 60° C.

Test of catalytic property is carried out in a plasma reactor with a voltage of 25 kV. The content of a methylbenzene gas is detected by a chromatographic instrument. The removal rate of methyl formate 1 # is seen in Table 1. Catalytic reaction is carried out under the microwave-free condition, and other detection conditions are unchanged. The removal rate of methyl formate 1 # is seen in Table 2.

Example 2

(a) preparation of a catalyst:

(1) dissolving cerium chloride into deionized water so that its concentration is 0.5 mol/L;

(2) adding NaOH in the solution until pH=9, and completely reacting for 4.5 h in a constant-temperature water bath pot of 90° C. after stirring to obtain cerium oxide-containing solution;

(3) adding potassium tetrachloropalladate and sodium borohydride together into the cerium oxide-containing solution, and stirring for 2.5 h, wherein, a mass ratio of potassium tetrachloropalladate added in the solution to sodium borohydride added in the solution to the cerium oxide-containing solution is 1:1.5:40;

(4) after the reaction is ended, centrifuging the solution on a centrifuge at 8000 rpm for 12 min, and then removing the solution in a centrifuge tube to obtain a precipitation product; and (5) washing the precipitation product with deionized water, then drying the precipitation product overnight at 100° C., and calcining in a muffle furnace at the $N_2$ atmosphere containing 8% of $H_2$ and having a temperature of 300° C. for 2 h to obtain a single atom catalyst $Pd/CeO_2$.

(b) microwave-assisted enhancement of degradation:

adding the catalyst $Pd/CeO_2$ into a reaction cavity, opening a stirrer, regulating the microwave power to 400 W, initiating microwave radiation to enhance the catalysis reaction, and, quickly introducing an ester compound, with a concentration of 5000 mg/m$^3$ and a space velocity of 50000 h$^{-1}$ into the reaction cavity from a vapor phase sampling port to react when a reaction temperature is 80° C.

Test of catalytic property is carried out in a plasma reactor with a voltage of 25 kV. The content of a methylbenzene gas is detected by a chromatographic instrument. The removal rate of ethyl acetate 2 # is seen in Table 1. Catalytic reaction is carried out under the microwave-free condition, and other detection conditions are unchanged. The removal rate of ethyl acetate 2 # is seen in Table 2.

Example 3

(a) preparation of a catalyst:

(1) dissolving cerium nitrate into deionized water to form a solution in which the concentration of the cerium nitrate is 0.4 mol/L;

(2) adding NaOH in the solution until pH=8.5, and completely reacting for 4 h in a constant-temperature water bath pot of 80° C. after stirring to obtain cerium oxide-containing solution;

(3) adding palladium chloride, potassium tetrachloropalladate and sodium borohydride together into the cerium oxide-containing solution, and stirring for 2 h, wherein, a mass ratio of palladium chloride added in the solution to potassium tetrachloropalladate added in the solution to sodium borohydride added in the solution to the cerium oxide-containing solution is 1:1:2.4:70;

(4) after the reaction is ended, centrifuging the solution on a centrifuge at 7000 rpm for 5 min, and then removing the solution in a centrifuge tube to obtain a precipitation product; and (5) washing the precipitation product with deionized water, then drying the precipitation product overnight at 90° C., and calcining in a muffle furnace at the $N_2$ atmosphere containing 7% of $H_2$ and having a temperature of 300° C. for 2 h to obtain a single atom catalyst $Pd/CeO_2$.

(b) microwave-assisted enhancement of degradation:

adding the catalyst $Pd/CeO_2$ into a reaction cavity, opening a stirrer, regulating the microwave power to 700 W, initiating microwave radiation to enhance the catalysis reaction, and quickly introducing an ester compound with a concentration of 500 mg/m$^3$ and a space velocity of 20000 h$^{-1}$ into the reaction cavity from a vapor phase sampling port to react when a reaction temperature is 10° C.

Test of catalytic property is carried out in a plasma reactor with a voltage of 25 KV. The content of a methylbenzene gas is detected by a chromatographic instrument. The removal rate of isobutyl acetate 3 # is seen in Table 1. Catalytic reaction is carried out under the microwave-free condition, and other detection conditions are unchanged. The removal rate of isobutyl acetate 3 # is seen in Table 2.

Example 4

(a) preparation of a catalyst:

(1) dissolving cerium nitrate into deionized water to form a solution in which the concentration of the cerium nitrate is 0.3 mol/L;

(2) adding NaOH in the solution until pH=8, and completely reacting for 3 h in a constant-temperature water bath pot of 70° C. after stirring to obtain cerium oxide-containing solution;

(3) adding potassium tetrachloropalladate and sodium borohydride together into the cerium oxide-containing solution, and stirring for 1 h, wherein, a mass ratio of potassium tetrachloropalladate added in the solution to sodium borohydride added in the solution to the cerium oxide-containing solution is 1:1.5:100;

(4) after the reaction is ended, centrifuging the solution on a centrifuge at 6000 rpm for 8 min, and then removing the solution in a centrifuge tube to obtain a precipitation product; and (5) washing the precipitation product with deionized water, then drying the precipitation product overnight at 70° C., and calcining in a muffle furnace at the $N_2$ atmosphere containing 6% of $H_2$ and having a temperature of 250° C. for 1.5 h to obtain a single atom catalyst $Pd/CeO_2$.

(b) microwave-assisted enhancement of degradation:

adding the catalyst $Pd/CeO_2$ into a reaction cavity, opening a stirrer, regulating the microwave power to 200 W, initiating microwave radiation to enhance the catalysis reaction, and quickly introducing an ester compound with a concentration of 50 mg/m$^3$ and a space velocity of 2000 h$^{-1}$ into the reaction cavity from a vapor phase sampling port to react when a reaction temperature is 35° C.

Test of catalytic property is carried out in a plasma reactor with a voltage of 25 KV. The content of a methylbenzene gas is detected by a chromatographic instrument. The removal rate of methyl acrylate 4 # is seen in Table 1. Catalytic reaction is carried out under the microwave-free condition, and other detection conditions are unchanged. The removal rate of methyl acrylate 4 # is seen in Table 2.

TABLE 1

Catalytic Purification Reaction Property of Ester Compounds on Catalyst under Microwave Condition

| Reaction condition | Catalyst | | | |
|---|---|---|---|---|
| | 1# | 2# | 3# | 4# |
| Space velocity (h$^{-1}$) | 100000 | 50000 | 20000 | 2000 |
| Voltage (kV) | 25 | 25 | 25 | 25 |
| Pre-treatment (mg/m$^3$) | 2000 | 5000 | 500 | 50 |
| Post-treatment (g/m$^3$) | 78 | 205 | 24.5 | 2.6 |
| Reaction time (min) | 35.3 | 16.8 | 33.9 | 30.4 |
| Removal rate (%) | 96.1 | 95.9 | 95.1 | 94.8 |

TABLE 2

Catalytic Purification Reaction Property of Ester Compounds on Catalyst under Microwave-free Condition

| Reaction condition | Catalyst | | | |
|---|---|---|---|---|
| | 1# | 2# | 3# | 4# |
| Space velocity (h$^{-1}$) | 100000 | 50000 | 20000 | 2000 |
| Voltage (kV) | 25 | 25 | 25 | 25 |
| Pre-treatment (mg/m$^3$) | 2000 | 5000 | 500 | 50 |
| Post-treatment (g/m$^3$) | 139 | 370 | 39.5 | 4.2 |
| Reaction time (min) | 44.1 | 21.3 | 40.1 | 38.5 |
| Removal rate (%) | 93.1 | 92.6 | 92.1 | 91.6 |

We claim:

1. A method for enhancing degradation of ester volatile organic compounds (VOCs) with a cerium oxide loaded palladium single atom catalyst under low-temperature microwave, comprising the following steps:
   (a) preparation of a catalyst:
   (1) dissolving a cerium-containing compound into deionized water to form a solution; adding NaOH in the solution, until pH=8-10, stirring, and then reacting in a water bath pot to obtain cerium oxide-containing solution;
   (2) adding a palladium-containing compound and sodium borohydride together into the cerium oxide-containing solution to react;
   (3) after the reaction is ended, centrifuging the solution on a centrifuge, and then removing the solution in a centrifuge tube to obtain a precipitation product; and
   (4) washing the precipitation product with deionized water, drying overnight, and calcining in a muffle furnace at $N_2$ atmosphere containing 3-7% of $H_2$ to obtain a single atom catalyst $Pd/CeO_2$;
   (b) microwave-assisted enhancement of degradation:
   adding the catalyst $Pd/CeO_2$ into a reaction cavity, opening a stirrer, initiating microwave radiation to enhance a catalysis reaction, and quickly introducing an ester compound with a concentration of 50-5000 mg/m$^3$ and a space velocity of 2000-100000 h$^{-1}$ into the reaction cavity from a vapor phase sampling port to degrade the ester VOCs when a reaction temperature is 10-80° C.

2. The method according to claim 1, wherein, the cerium-containing compound is one or two of cerium nitrate and cerium chloride; a concentration of the cerium-containing compound dissolved into deionized water is 0.3-0.6 mol/L.

3. The method according to claim 1, wherein, the water bath pot is at a constant temperature of 70-100° C.; and the cerium oxide-containing solution is obtained by reacting for 3-5 h.

4. The method according to claim 1, wherein, the palladium-containing compound is one or two of palladium chloride and potassium tetrachloropalladate.

5. The method according to claim 1, wherein, a mass ratio of the palladium-containing compound to sodium borohydride to the cerium oxide-containing solution is 1:(1-1.5):(10-100).

6. The method according to claim 1, wherein, a speed, of the centrifuge is 6000-10000 rpm, and centrifugation is carried out for 5-15 min.

7. The method according to claim 1, wherein, the precipitation product is dried overnight at 70-110° C.

8. The method according to claim 1, wherein, calcination is carried out for 1.5-2.5 h in the muffle furnace at the $N_2$ atmosphere containing 6-10% of $H_2$ and having a temperature of 250-350° C.

9. The method according to claim 1, wherein, a microwave power of a microwave reactor is 200 W-700 W.

\* \* \* \* \*